US012759641B2

(12) United States Patent
Kwon et al.

(10) Patent No.: US 12,759,641 B2
(45) Date of Patent: Oct. 13, 2026

(54) VEHICLE A PILLAR BRACKET

(71) Applicant: DAEHAN SOLUTION CO., LTD, Incheon (KR)

(72) Inventors: Choong Ho Kwon, Seoul (KR); Yong-Seok Jeon, Incheon (KR)

(73) Assignee: DAEHAN SOLUTION CO., LTD, Incheon (KR)

( * ) Notice: Subject to any disclaimer, the term of this patent is extended or adjusted under 35 U.S.C. 154(b) by 287 days.

(21) Appl. No.: 18/752,896

(22) Filed: Jun. 25, 2024

(65) Prior Publication Data

US 2025/0002089 A1 Jan. 2, 2025

(30) Foreign Application Priority Data

Jun. 28, 2023 (KR) ........................ 10-2023-0083369

(51) Int. Cl.

*B62D 25/04* (2006.01)
*B60J 10/84* (2016.01)
*B60R 13/02* (2006.01)
*B60J 10/21* (2016.01)

(52) U.S. Cl.

CPC .............. *B62D 25/04* (2013.01); *B60J 10/84* (2016.02); *B60R 13/025* (2013.01); *B60J 10/21* (2016.02)

(58) Field of Classification Search

CPC ......... B62D 25/04; B60J 10/084; B60J 10/21; B60R 13/0212; B60R 13/025; B60R 13/06; B60R 2013/0293
USPC ............................................ 296/193.06, 214
See application file for complete search history.

(56) References Cited

U.S. PATENT DOCUMENTS

| | | | | |
|---|---|---|---|---|
| 10,252,604 | B2 * | 4/2019 | Sugawa | B60J 10/36 |
| 2025/0033579 | A1 * | 1/2025 | Kwon | B60R 13/0212 |

FOREIGN PATENT DOCUMENTS

| | | | | | |
|---|---|---|---|---|---|
| KR | 10-1966527 | B1 | | 4/2019 | |
| KR | 102020315 | B1 | * | 9/2019 | B60R 13/0225 |
| KR | 10-2042030 | B1 | | 11/2019 | |
| KR | 10-2098344 | B1 | | 4/2020 | |

OTHER PUBLICATIONS

KR20170083180A with English translation; Kwon et al.; Jul. 18, 2017 (Year: 2026).*

(Continued)

*Primary Examiner* — Roger L Pang
(74) *Attorney, Agent, or Firm* — Dickinson Wright PLLC

(57) ABSTRACT

When a pillar bracket is formed, as a protruding portion is integrally formed outward from an edge of a headliner, and a weather strip is fitted onto the protruding portion, the weather strip may maintain a predetermined shape to prevent a gap from being generated between the headliner and the weather strip. In this case, as the protruding portion is formed to always remain in close contact with a vehicle body panel, since the protruding portion fixedly supports the weather strip in close contact with the vehicle body panel and is not pushed any further, the weather strip may not be pushed or bent any further and may always maintain a predetermined shape. In addition, as a protruding rib integrally protrudes from the protruding portion, the protruding portion may fixedly support the weather strip more firmly in close contact with the vehicle body panel and thus more firmly and fixedly support the weather strip.

3 Claims, 8 Drawing Sheets

(56) References Cited

OTHER PUBLICATIONS

KR2020102193300B1 with English translation; Kwon et al.; Dec. 15, 2020 (Year: 2026).*
KR20230060693A with English translation; Kwon et al.; May 8, 2023 (Year: 2026).*
English translation of KR 102020315B1; https://translationportal.epo.org; May 19, 2026 (Year: 2026).*

* cited by examiner

VEHICLE A PILLAR BRACKET

CROSS-REFERENCE TO RELATED APPLICATION

This application claims priority to and the benefit of Korean Patent Application No. 10-2023-0083369, filed on Jun. 28, 2023, the disclosure of which is incorporated herein by reference in its entirety.

BACKGROUND

1. Field of the Invention

The present invention relates to a vehicle A pillar bracket, and more specifically, to a vehicle A pillar bracket in which a protruding portion is formed to protrude outward from an edge of a headliner, a door weather strip of a door is formed to be fitted in a state in which the protruding portion is in close contact with a vehicle body to fixedly support the door weather strip such that the door weather strip does not deviate from a predetermined location in a state in which the protruding portion supported by the vehicle body is not easily deformed or does not deviate from the location, and thus a gap between the door weather strip and the headliner is prevented from being widened or the door weather strip is prevented from being bent to improve the quality of a vehicle. In this case, as a protruding rib is integrally formed to protrude from the protruding portion to be in close contact with the vehicle body, the protruding portion does not easily deviate or escape from the predetermined location to firmly and fixedly support the door weather strip.

2. Discussion of Related Art

In general, a door weather strip is mounted on an opening part, at which a vehicle door is opened or closed, to cover a gap between a vehicle body and the door and protect a vehicle interior from external parts. Such a door weather strip is manufactured to have various functions, such as a waterproof function to prevent rainwater or foreign matter from being introduced into the vehicle interior, a soundproof function to block noise and vibrations from being introduced into the vehicle interior from the outside while driving the vehicle, and a function for protecting the vehicle body and the door when the door is closed.

Technologies about door weather strips having various functions are disclosed in the following Patent Documents 1 to 3.

(Patent Document 1) Korean Patent Registration No. 10-2098344

This relates to the structure of a door weather strip of a vehicle door, which includes a tube forming a sealing surface, a carrier connected to the tube and fixed to a flange formed on a side outer panel of a vehicle body, an inner steel formed in the carrier to open the carrier for the flange to be inserted into the carrier, and a lever which is provided on the inner steel and adjusts an opening angle of the carrier so that a coupling force between the side outer panel and the door weather strip of the vehicle is increased to improve the sealing performance, and thus there are effects of improving marketability and also improving assembly convenience during assembly.

(Patent Document 2) Korean Patent Registration No. 10-2042030

This relates to a door weather strip of a vehicle door. The door weather strip of the vehicle door is mounted on an installation part of an edge portion of a door frame and may include i) a body part which is fixed to the installation part and has a quadrangular shaped cross section and in which a body hollow is formed, ii) a tube part which is formed to protrude from the body part toward the inside of a vehicle, in which a seal hollow is formed, and which is in contact with an outer surface of a vehicle body when the door is closed, iii) a watertight lip part which is formed to protrude from the body part toward the outside of the vehicle and is in contact with the door frame, iv) an upper lip part which is formed on the body part toward an upper portion of the vehicle, is curved toward the outside of the vehicle, and is in contact with the outer surface of the vehicle body when the door is closed, v) an air discharge passage formed in the installation part of the door frame along a section corresponding to a roof of the vehicle body through the watertight lip part, and vi) an air discharge part which is provided in each of the body part and the tube part, allows air in the vehicle to be introduced into the air discharge passage through each of the seal hollow and the body hollow, and discharges the air to the outside of the vehicle through both ends of the air discharge passage.

(Patent Document 3) Korean Patent Registration No. 10-1966527

This relates to a door weather strip assembly of a vehicle door of which a cross section is deformed to maintain an airtight function while allowing doors to be opened in any order in a vehicle provided with opposite swing doors in which a front door and a rear door are opened or closed in opposite directions. The door weather strip assembly of the vehicle door, of which the cross section is deformed and which is installed in the periphery of the vehicle door to airtightly seal the periphery of the door, includes a variable door weather strip which is installed on a portion of a periphery of one door of the rear door and the front door of the vehicle, airtightly seals a gap of the other door of the rear door and the front door, and is formed of a flexible material such that a cross-sectional shape of the variable door weather strip is changed when the door is opened or closed, a cross section varying unit which changes a cross-sectional area of the variable door weather strip such that the variable door weather strip is deformed flat when the door is opened or closed, and a control unit which controls the cross section varying unit such that the cross-sectional area of the variable door weather strip decreases when the opening start of the door is detected, and the variable door weather strip is restored to its original state when the door is completely closed.

RELATED ART

Patent Document (Patent Document 1) Korean Patent Registration No. 10-2098344 (Registration Date: Apr. 1, 2020)

(Patent Document 2) Korean Patent Registration No. 10-2042030 (Registration Date: Nov. 1, 2019)

(Patent Document 3) Korean Patent Registration No. 10-1966527 (Registration Date: Apr. 1, 2019)

SUMMARY OF THE INVENTION

However, such an existing door weather strip has the following problems.

(1) A door weather strip installed on an upper portion of an opening part of a vehicle on which a door is mounted should be mounted to be bent into a curved shape.

Accordingly, as the door weather strip generally manufactured in a longitudinal member type is assembled, a gap may be generated between the door weather strip and a headliner.

(2) In particular, in a state in which the headliner formed in a complicated three-dimensional shape is mounted on a roof panel, the door weather strip should be mounted on a vehicle body portion on which the door is mounted to finish an edge portion of a headliner. Accordingly, a gap is generated between the edge portion of the headliner formed in a complicated shape and the door weather strip of which a straight form should be bent and assembled, and thus the sense of beauty and aesthetics of a vehicle interior are degraded.

(3) In this case, such a gap is severely generated at a corner portion of a headliner, that is, a portion on which an A pillar bracket is mounted.

The present invention is directed to providing a vehicle A pillar bracket in which a protruding portion protruding outward from an edge of a headliner is integrally formed when a pillar bracket mounted on a corner portion of the headliner is formed, and a door weather strip is formed to be fitted onto the protruding portion, and thus a predetermined shape of the door weather strip is maintained, and a gap is prevented from being generated between the headliner and the door weather strip, thereby improving the sense of beauty and aesthetics.

In this case, the present invention is also directed to providing the vehicle A pillar bracket in which the protruding portion is formed to always remain in close contact with a vehicle body, the protruding portion fixedly supports the door weather strip in close contact with a vehicle body panel without being pushed any further, and thus the door weather strip is not pushed or bent any further and always maintains a predetermined shape.

In addition, the present invention is also directed to providing the vehicle A pillar bracket in which a protruding rib integrally protrudes from the protruding portion so that the protruding portion fixedly supports the door weather strip more firmly close contact with a vehicle body panel to more firmly and fixedly support the door weather strip.

According to an aspect of the present invention, there is provided a vehicle A pillar bracket including a pillar body (100) which is mounted on a corner portion of a front side of a headliner (H) and supports an A pillar, wherein the pillar body (100) has a protruding portion (110) formed to protrude outward from an edge of the headliner (H) in a cramp iron shape, the protruding portion (110) is installed so that an outer surface thereof is in contact with a vehicle body (F), and a door weather strip (W) is forcibly fitted onto an end portion of the protruding portion (110) so that the door weather strip (W) surrounds an edge portion of the headliner (H).

In particular, the protruding portion (110) may be formed so that a width cross section is formed in a "⊏" shape or mountain shape of which a central portion protrudes upward.

In addition, a protruding rib (111) may be formed on a surface of the protruding portion (110) in contact with the vehicle body.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

A set of FIG. 4A and FIG. 4B is a view showing an entire structure of the vehicle A pillar bracket according to the present invention, wherein FIG. 4B is a front view thereof;

DETAILED DESCRIPTION OF EXEMPLARY EMBODIMENTS

Figure 1:
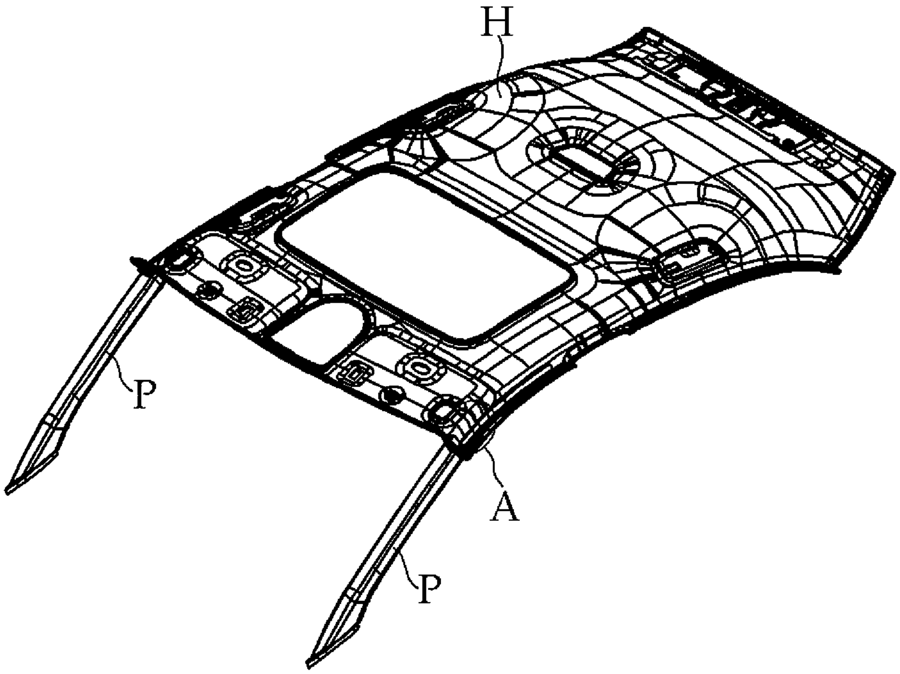
FIG. 1 is a perspective view illustrating a mounting state of a headliner and an A pillar for showing a location at which a vehicle A pillar bracket according to the present invention is mounted.

Hereinafter, exemplary embodiments of the present invention will be described in more detail with reference to the accompanying drawings. Moreover, terms and words used in the present specification and claims should not be interpreted as being limited to commonly used meanings or meanings in dictionaries and should be interpreted as having meanings and concepts which are consistent with the technological scope of the invention based on the principle that the inventors have appropriately defined concepts of terms in order to describe the invention in the best way.

Therefore, since the embodiments described in this specification and components illustrated in the drawings are only exemplary embodiments and do not represent the overall technological scope of the invention, it should be understood that there may be various equivalents or modifications that can be substituted in the exemplary embodiments at the time of filing of this application.

Structure of Vehicle A Pillar Bracket

As illustrated in FIGS. 1 to 8, a vehicle A pillar bracket according to the present invention includes a pillar body 100 which is mounted on each corner portion of a front side of a headliner H and supports an A pillar.

In particular, in the pillar body 100, a protruding portion 110 is formed to protrude outward from an edge of the headliner H, a door weather strip W is forcibly fitted onto the protruding portion 110 to surround an edge portion of the headliner H to prevent the generation of a gap generated by the door weather strip W being pressed or conversely protruding in mismatch with a surface of the headliner H and improve the aesthetics and sense of beauty.

In this case, as the protruding portion 110 is formed in close contact with a vehicle body panel F on which the door weather strip W is mounted, the protruding portion 110 is not deformed or pushed inward, and the door weather strip W never deviates or escapes from a predetermined location, thus preventing the gap from being generated between the protruding portion 110 and the headliner H.

In addition, as a protruding rib 111 is integrally formed on a surface of the protruding portion 110 in contact with the vehicle body panel F, strength of the protruding portion 110 is reinforced and it is prevented from being easily pressed or deformed.

Such a structure will be described in more detail below with reference to the accompanying drawings.

A. Pillar Body

As illustrated in FIGS. 1 to 4, one pillar body 100 is mounted on each front corner portion of the headliner H. In this case, the pillar body 100 may be formed in the same shape as the surface of the headliner H to be firmly fixed in close contact with the surface of the headliner H using an adhesive or the like.

The pillar body 100 may be manufactured using a material capable of firmly supporting the A pillar, such as a metal or a synthetic resin with light weight, flexibility, and rigidity.

Figure 2:
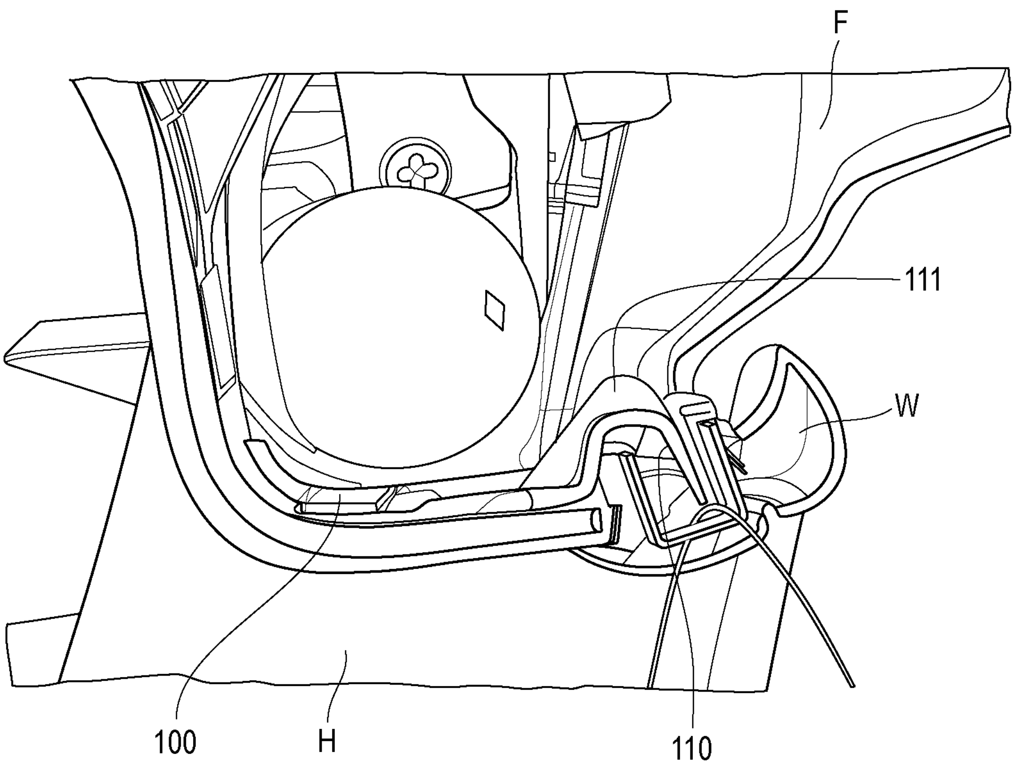
FIG. 2 is a perspective view illustrating portion A of FIG. 1 which shows a state in which the vehicle A pillar bracket according to the present invention is mounted on the headliner and a protruding portion in close contact with a vehicle body supports a door weather strip.
Figure 3:
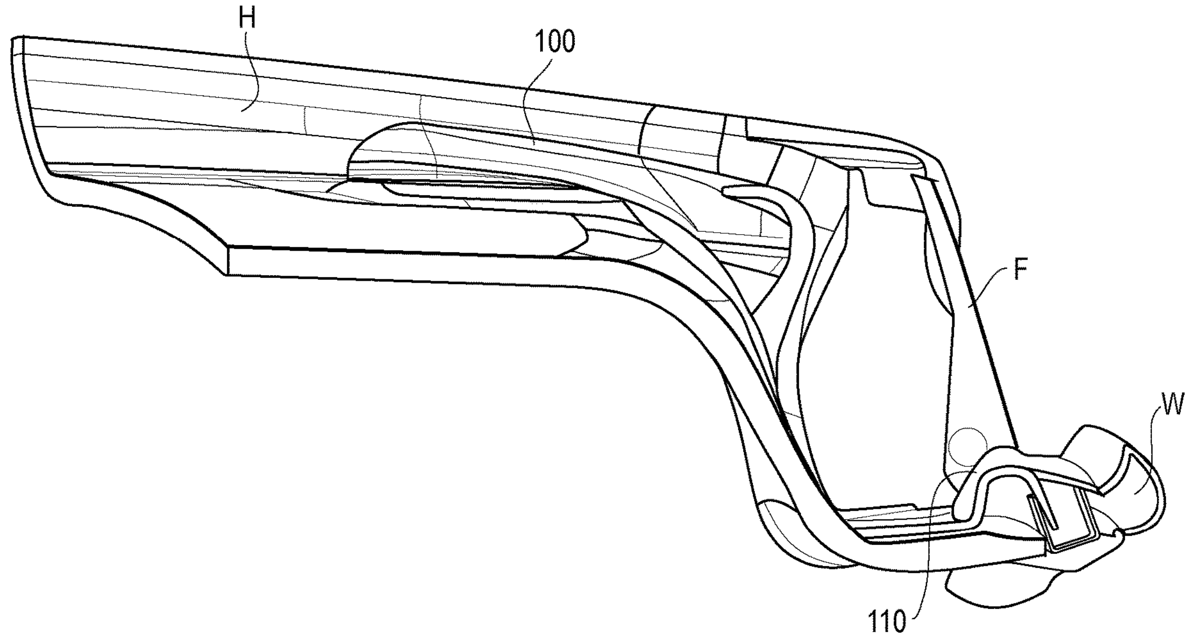
FIG. 3 is a cross-sectional view illustrating the state in which the vehicle A pillar bracket according to the present invention is mounted on the headliner and the protruding portion in close contact with the vehicle body supports the door weather strip.
Figure 4A:
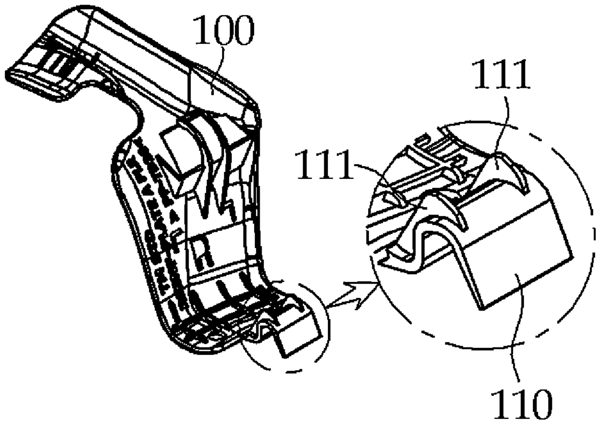
FIG. 4A is a perspective view thereof.
Figure 4B:
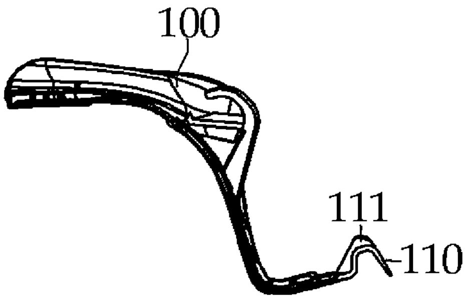

Meanwhile, as illustrated in FIGS. 2 to 4, the protruding portion 110 extends from one edge of the pillar body 100 and is integrally formed in a cramp iron shape.

B. Protruding Portion

As illustrated in FIGS. 2 to 5, the protruding portion 110 is formed to protrude outward on the edge of the headliner H. In this case, the protruding portion 110 is formed at a location at which the door weather strip W installed on the vehicle body panel F is forcibly fitted onto the protruding portion 110 to finish the edge portion of the headliner H.

Figure 5:
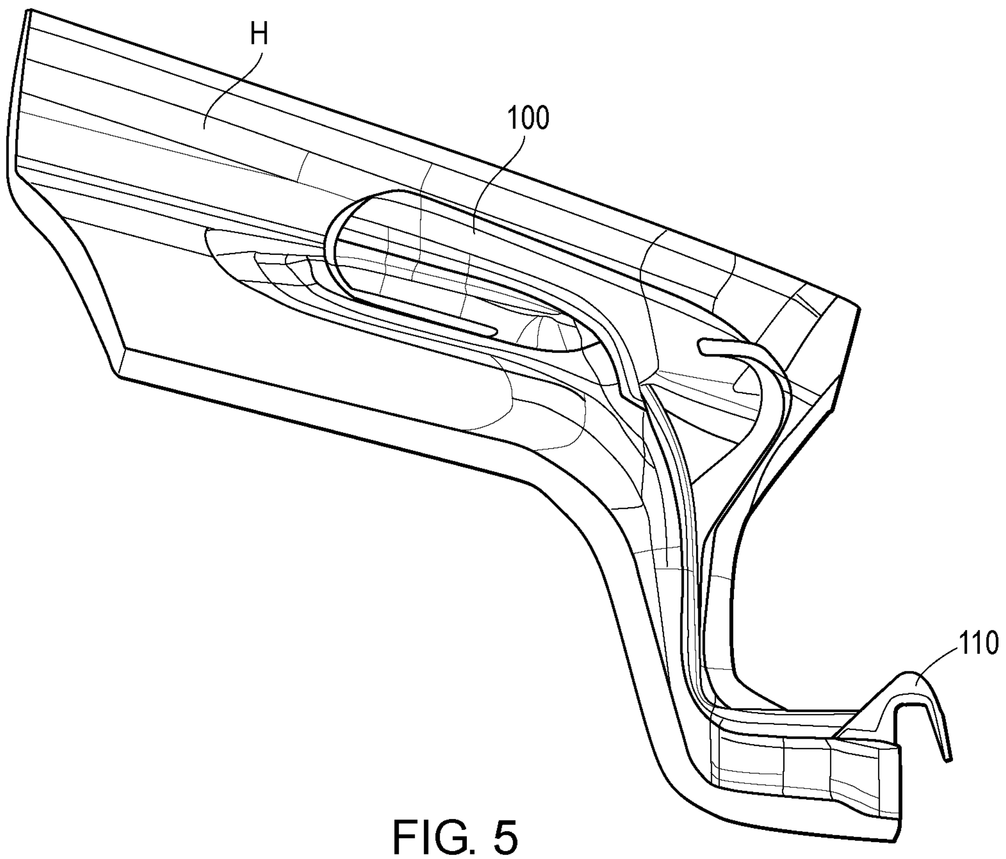
FIG. 5 is a perspective view illustrating a state in which the vehicle A pillar bracket according to the present invention is attached to the headliner.
Figure 6:
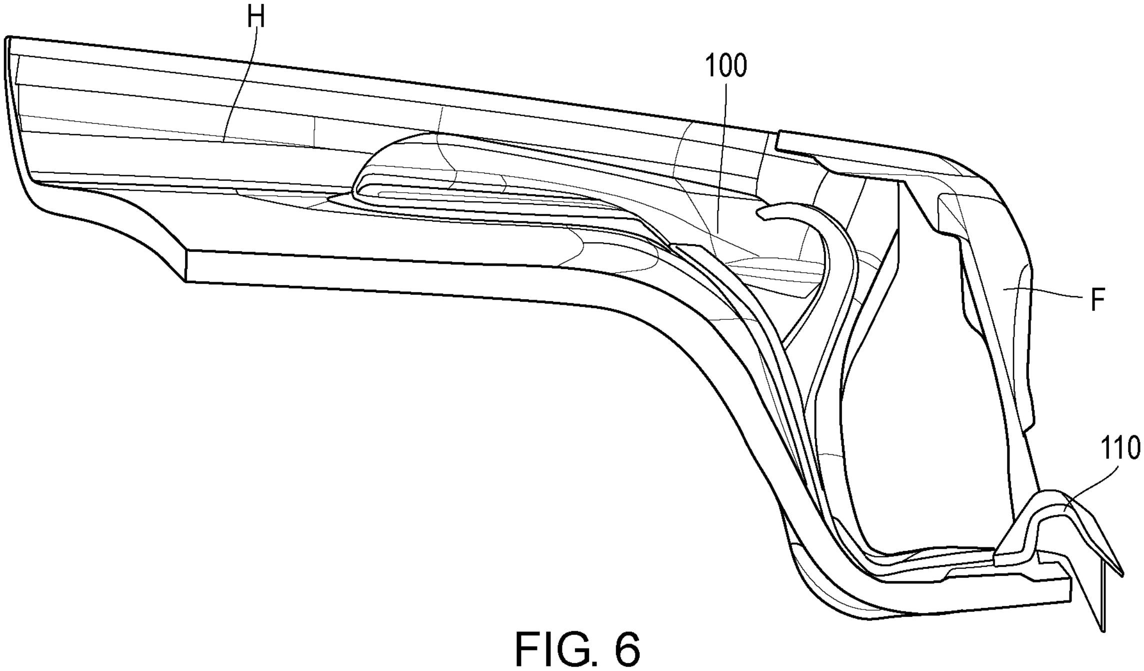
FIG. 6 is a perspective view illustrating a state in which the protruding portion of the A pillar bracket according to the present invention attached to the headliner is in close contact with a vehicle body panel as the headliner is mounted on a roof panel.
Figure 7:
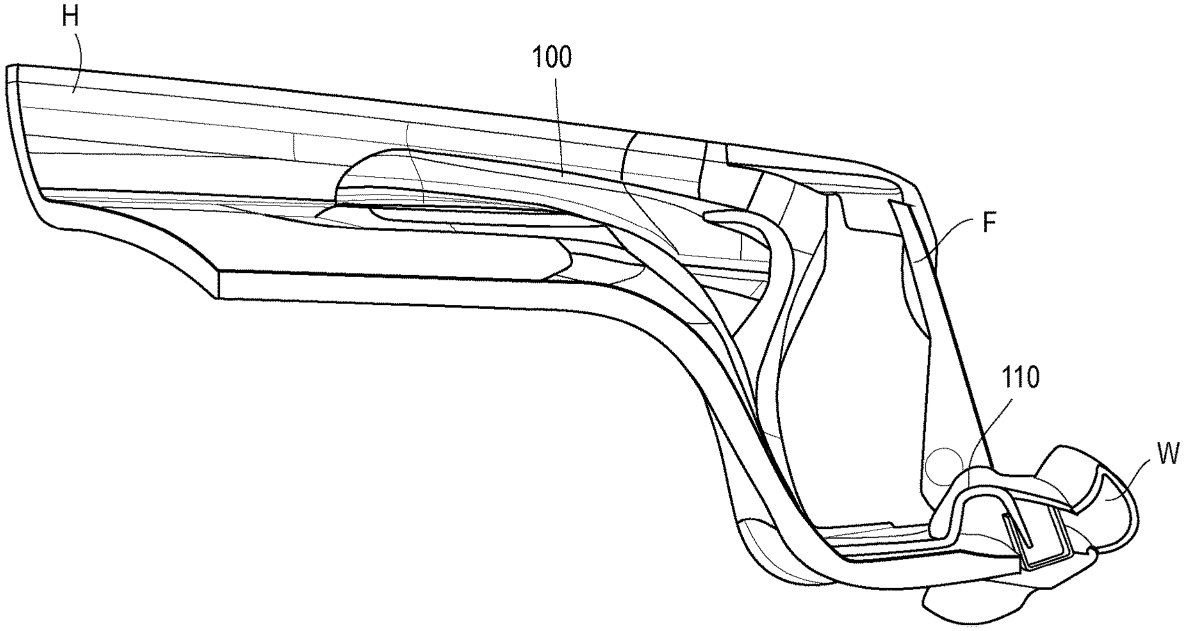
FIG. 7 is a perspective view illustrating a state in which the door weather strip is forcibly fitted onto and assembled with the protruding portion after the headliner is mounted on the roof panel as illustrated in FIG. 6.
Figure 8:
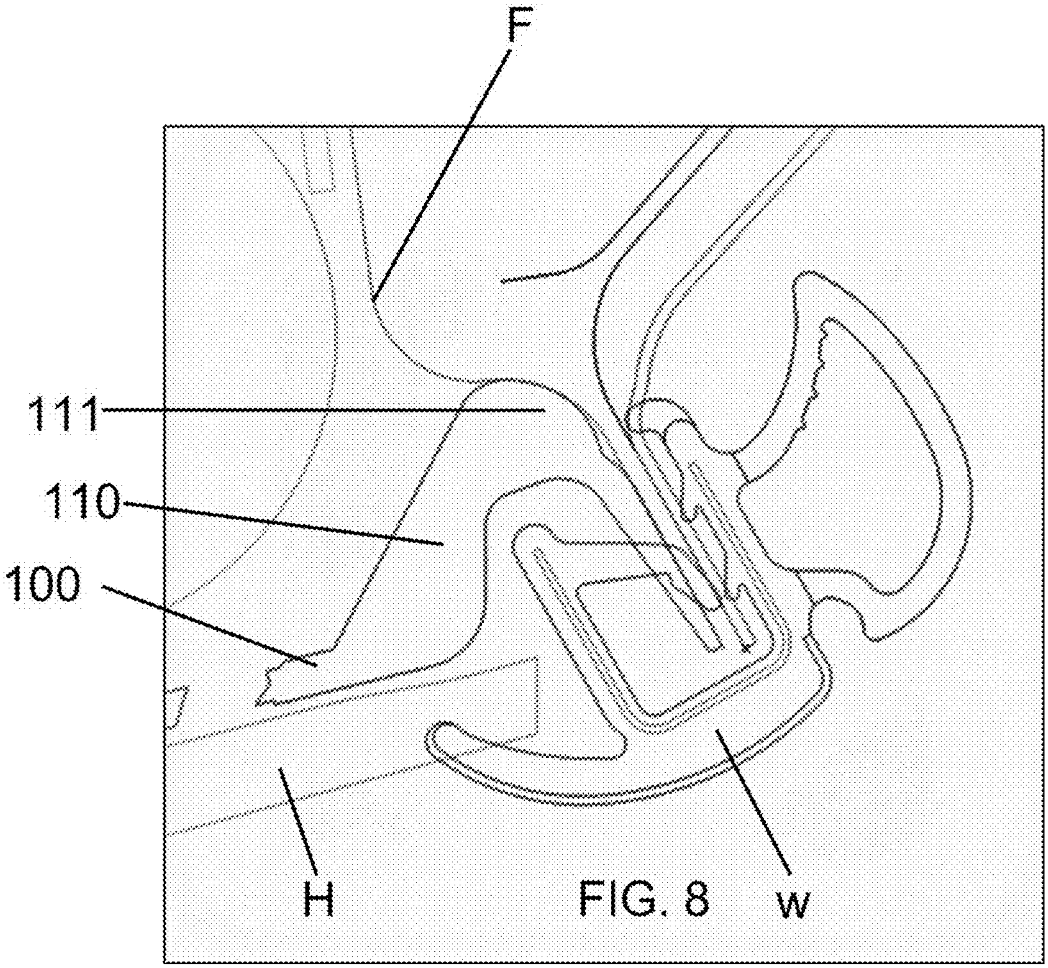
FIG. 8 is a cross-sectional view illustrating a state in which the vehicle A pillar bracket according to the present invention is assembled.

As illustrated in FIGS. 4, 5, and 8, this is because, as the door weather strip W is fitted onto the protruding portion 110, the door weather strip W is not easily curved, deformed, or bent but maintains a state of covering the edge portion of the headliner H, a gap is not generated between the door weather strip W and the headliner H, and thus the sense of beauty and aesthetics of the vehicle interior can be improved.

Meanwhile, in the exemplary embodiment of the present invention, as illustrated in FIGS. 3 and 6 to 8, when the headliner H on which the pillar body 100 is mounted is assembled with a roof panel, an outer portion of the protruding portion 110 may be formed in contact with the surface of the vehicle body panel F on which the door weather strip W is mounted. This is because, as the door weather strip W is pressed from a side of the vehicle interior or repeatedly pressed when a vehicle door is closed, the door weather strip W may be deformed or bent, and the protruding portion 110 is formed to support the door weather strip W while being supported by the vehicle body panel F to prevent the door weather strip W from being bent, folded, or pressed to prevent the gap from being generated between the headliner H and the door weather strip W.

In addition, in the exemplary embodiment of the present invention, as illustrated in FIGS. 4 and 8, the protruding rib 111 may be integrally formed to protrude from the surface of the protruding portion 110 in contact with the vehicle body panel F. This is for the protruding rib 111 to be directly in close contact with the vehicle body panel F to reinforce the structural strength of the protruding portion 110. Accordingly, as illustrated in FIG. 8, since right and upper portions of the protruding portion 110 are in close contact with the vehicle body panel F, the protruding portion 110 is prevented from moving to a right side or upper side and firmly and fixedly supported.

The protruding portion 110 may be formed in any shape that can be fitted into the door weather strip W, such as, a "⊏" shape as illustrated in FIG. 4, a mountain shape in which a central portion protrudes upward, or the like.

In the present invention provided as described above, since the door weather strip is fitted onto the protruding portion integrally formed to protrude from the pillar body, the door weather strip is not easily deformed or pressed, and the gap is not generated between the headliner and the door weather strip, which improves the sense of beauty and aesthetics of the vehicle interior. In this case, as the protruding portion is installed in close contact with a surface of the vehicle body panel on which the door weather strip is mounted, the protruding portion more firmly and fixedly supports the door weather strip.

A vehicle A pillar bracket according to the present invention has the following effects.

(1) As an edge portion of a headliner extends outward, a protruding portion is formed in a cramp iron shape, and a door weather strip is forcibly fitted onto and assembled with the protruding portion, a gap generated by the door weather strip mounted in a curved shape being deformed or pressed in mismatch with a surface of a headliner can be removed.

(2) As the protruding portion fixedly supports the door weather strip, when the door weather strip surrounds and finishes an edge portion of the headliner, a gap is not generated, and thus the sense of beauty and aesthetics of a vehicle interior can be improved.

(3) Meanwhile, as an outer portion of the protruding portion is formed in contact with a vehicle body panel on which the door weather strip is mounted, the protruding portion is supported by the vehicle body panel to minimize deformation or damage of the protruding portion so that the door weather strip can always maintain a predetermined shape to prevent a gap from being generated at the headliner and maintain the quality.

(4) In this case, as a protruding rib is formed on the protruding portion in close contact with the vehicle body panel, the strength of the protruding portion can be reinforced, and a gap can also be prevented from being generated between the door weather strip and the headliner.

What is claimed is:

1. A vehicle A pillar bracket comprising a pillar body (100) which is mounted on a corner portion of a front side of a headliner (H) and supports an A pillar, wherein the pillar body (100) has a protruding portion (110) formed to protrude outward from an edge of the headliner (H) in a cramp iron shape, the protruding portion (110) is installed so that an outer surface thereof is in contact with a vehicle body (F), and a door weather strip (W) is forcibly fitted onto an end portion of the protruding portion (110) so that the door weather strip (W) surrounds an edge portion of the headliner (H).

2. The vehicle A pillar bracket of claim 1, wherein the protruding portion (110) is formed so that a width cross section is formed in a "⊏" shape or mountain shape of which a central portion protrudes upward.

3. The vehicle A pillar bracket of claim 1 or 2, wherein a protruding rib (111) is formed on a surface of the protruding portion (110) in contact with the vehicle body.

* * * * *